United States Patent
Diab et al.

(10) Patent No.: US 8,929,210 B2
(45) Date of Patent: *Jan. 6, 2015

(54) SYSTEM AND METHOD FOR ENABLING ENERGY EFFICIENT ETHERNET NETWORKS WITH TIME-SENSITIVE PROTOCOLS

(71) Applicant: Broadcom Corporation, Irvine, CA (US)

(72) Inventors: Wael William Diab, San Francisco, CA (US); Eric Spada, Groton, MA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/104,248

(22) Filed: Dec. 12, 2013

(65) Prior Publication Data

US 2014/0101473 A1  Apr. 10, 2014

Related U.S. Application Data

(63) Continuation of application No. 13/422,497, filed on Mar. 16, 2012, now Pat. No. 8,619,559.

(60) Provisional application No. 61/593,385, filed on Feb. 1, 2012.

(51) Int. Cl.
| | |
|---|---|
| *H04L 1/00* | (2006.01) |
| *G06F 1/32* | (2006.01) |
| *H04L 12/12* | (2006.01) |
| *G06F 1/00* | (2006.01) |

(52) U.S. Cl.
CPC ........ *G06F 1/32* (2013.01); *H04L 12/12* (2013.01); *Y02B 60/43* (2013.01); *Y02B 60/44* (2013.01); *Y02B 60/35* (2013.01); *Y02B 60/34* (2013.01)
USPC .......................................... 370/229; 713/323

(58) Field of Classification Search
None
See application file for complete search history.

(56) References Cited

U.S. PATENT DOCUMENTS

| | | | |
|---|---|---|---|
| 8,307,234 B2 | 11/2012 | Gobriel et al. | |
| 8,619,559 B2 * | 12/2013 | Diab et al. | 370/229 |
| 2007/0240006 A1 * | 10/2007 | Fung | 713/323 |
| 2010/0309932 A1 | 12/2010 | Diab et al. | |
| 2011/0029796 A1 | 2/2011 | Matthews et al. | |
| 2011/0208986 A1 | 8/2011 | Soga | |

* cited by examiner

*Primary Examiner* — Clemence Han
(74) *Attorney, Agent, or Firm* — Duane S. Kobayashi

(57) ABSTRACT

A system and method for enabling energy efficient Ethernet networks with time-sensitive protocols. Time-stamped packets generated by a time-sensitive protocol rely on fixed latency in a transit time through a transmission subsystem. An energy efficiency control policy in a network device governs a transmission of time-stamped packets in accordance with energy efficiency initiatives controlled by the energy efficiency control policy. In one embodiment, time-stamped packets can be dropped or modified to account for transitions by the transmission subsystem into an energy saving state. In another embodiment, transitions by the transmission subsystem into or out of an energy saving state can be impacted by the existence of time-stamped packets scheduled for transmission.

18 Claims, 4 Drawing Sheets

SYSTEM AND METHOD FOR ENABLING ENERGY EFFICIENT ETHERNET NETWORKS WITH TIME-SENSITIVE PROTOCOLS

This application is a continuation of non-provisional patent application Ser. No. 13/422,497, filed Mar. 16, 2012, which claims priority to provisional patent application No. 61/593,385, filed Feb. 1, 2012. Each of the above-identified applications is incorporated by reference herein, in its entirety, for all purposes.

BACKGROUND

1. Field of the Invention

The present invention relates generally to Ethernet networks and, more particularly, to a system and method for enabling energy efficient Ethernet networks with time-sensitive protocols.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks (IEEE 802.3az) has arisen to address the rising costs of IT equipment usage as a whole (i.e., PCs, displays, printers, switches, servers, network equipment, etc.).

In designing an energy efficient solution, one of the considerations is network link utilization. For example, many network links are typically in an idle state between sporadic bursts of data traffic. An additional consideration for an energy efficient solution is the extent to which the traffic is sensitive to buffering and latency. For example, some traffic patterns (e.g., HPC cluster or high-end 24-hr data center) are very sensitive to latency such that buffering would be problematic.

The application itself can also be a significant consideration. For example, one level of analysis can consider whether the application is a home network, service provider, enterprise, or a data center. The analysis can go deeper still by examining scenarios such as the type of network element within a given application. For example, the analysis can consider whether it is a gateway or a switch in a home network, or can consider whether it is a wiring closet or aggregation point in an enterprise network. The particular use of the network element can also be considered, such as whether it is an audio-video bridging switch for the home running a streaming application.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
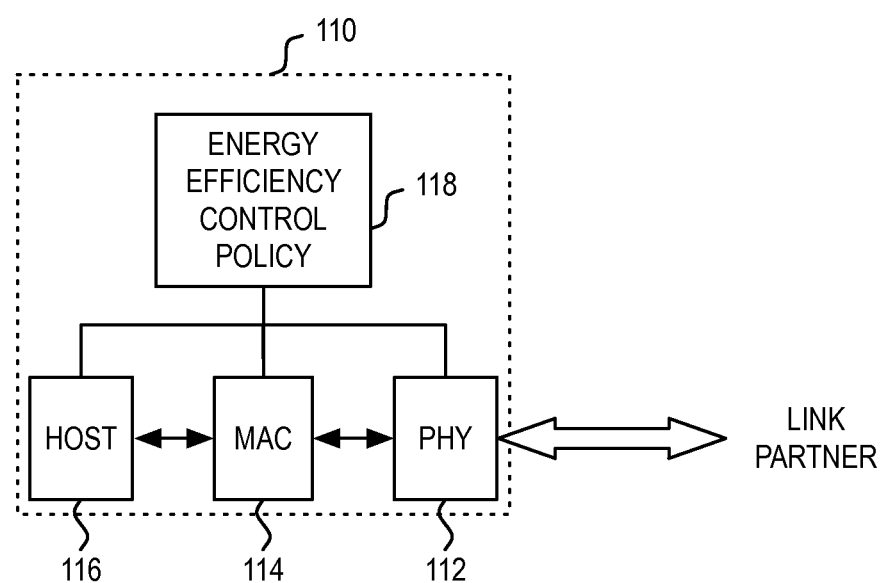
FIG. 1 illustrates an example of an energy efficiency control policy implemented in a network device.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Energy efficient networks often attempt to save power when the traffic utilization of a network link is at a low level. This serves to minimize the performance impact while maximizing power savings. At a broad level, the energy efficiency control policy for a particular link in the network determines when to enter an energy saving state, what energy saving state to enter (i.e., level of energy savings) to enter, how long to remain in that energy saving state, what energy saving state to transition to out of the previous energy saving state, etc.

In one embodiment, the energy efficiency control policy can be designed to control the transitions of a transmission subsystem (e.g., physical layer device) between a plurality of energy saving states. In one example, the energy efficiency control policy can control the data rate of the transmission subsystem to enable the network device and possibly its link partner to communicate in a more energy efficient manner. Here, the energy efficiency control policy can cause the transmission subsystem to transition from an active state to an energy saving state.

In one embodiment, the energy saving state of the transmission subsystem can support a reduced link rate that is a sub-rate of the main link rate used by the active state. This enables a reduction in power by the transmission subsystem, thereby leading to power savings. In one example, this sub-rate can be a zero rate, which produces maximum power savings.

One example of sub-rating is through the use of a subset physical layer device (PHY) technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate (e.g., turning off three of four channels). In another embodiment, the subset PHY technique can be enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10 G enhanced core can be transitioned down to a 1 G link rate when idle, and sped back up to a 10 G link rate when data is to be transmitted.

Another example of sub-rating is through the use of a low power idle (LPI) technique. In general, LPI relies on entering a quiet state where power savings can be achieved when there is nothing to transmit. Power is thereby saved when the link is off. Refresh signals can be sent periodically to enable wake up from the sleep mode.

In general, both the subset and LPI techniques involve turning off or otherwise modifying portions of the PHY during a period of low link utilization. As in the PHY, power savings in the higher layers, such as the media access control (MAC) layer, can also be achieved by using various forms of sub-rating as well. In general, the entry of a PHY into an energy saving state can trigger the entry of upper subsystems above the PHY to enter into an energy saving state as well. This cascading process can seek to maximize the potential for energy savings.

When the transmission subsystem enters into an energy saving state such as LPI, the transmission subsystem effectively enters into a sleep state where no data is transmitted. Significant power savings are achieved during periods of low link utilization as the transmission of IDLE signals on the link consumes just as much power as the transmission of data.

As noted, the energy efficiency control policy is responsible for determining when to enter an energy saving state, what energy saving state (i.e., level of energy savings) to enter, how long to remain in that energy saving state, what energy saving state to transition to out of the previous energy saving state, how much circuitry in the PHY or higher layers to switch off, etc. When an energy efficiency control policy decides that the transmission subsystem should transition from an energy saving state (e.g., LPI) back to an active state, an increase in latency occurs. This results because the data packet would be buffered until the transmission subsystem completes its transition from the energy saving state back to the active state.

The temporary increase in latency may not present an issue for traffic that is relatively insensitive to buffering and latency. Some traffic, however, is very sensitive to latency such that buffering of a packet can have a significant negative impact. Consider, for example, traffic generated by a time-sensitive protocol such as that generated by IEEE 1588 and/or the Audio Video Bridging (AVB) suite of protocols (e.g., IEEE 802.1AS).

Clock synchronization protocols are based on time-stamped packets that are propagated between nodes in the network. The time stamps contained within the time-stamped packets can be used by the nodes to learn the lengths of the links between the nodes, and thereby compensate as needed for latency. In this process, it is generally assumed that once the time-stamped packet is generated and scheduled for transmission, the packet is going to take a relatively fixed amount of time to traverse the transmission subsystem. Here, it should be noted that the transmission subsystem can represent the PHY, or the PHY in combination with higher layer elements that receive a generated time-stamped packet for transmission.

Ordinarily, the transmission subsystem adds a fixed delay before a time-stamped packet is actually transmitted onto a transmission medium. The utilization of energy saving states by the transmission subsystem breaks the assumption of the addition of a known, fixed delay. Specifically, the time needed to transition from an energy saving state to an active state can introduce additional latency, variable latency that is unpredictable. In other words, the energy savings produced through the actions of the energy efficiency control policy can interfere with the operation of time-sensitive messaging protocols operating in the network. This interference can lead to the delivery of inaccurate time-stamp information that can compromise the integrity of the results generated by the time-sensitive messaging protocol.

As will be described in greater detail below, the principles of the present invention provide a mechanism for reducing the interference of energy saving initiatives in a network device with time-sensitive messaging protocols. It is a feature of the present invention that the reduction in interference can be accomplished through a cooperation of an energy efficiency control policy with the time-sensitive messaging protocols. As would be appreciated, the independent operation of an energy efficiency control policy and a time-sensitive protocol can introduce significant negative consequences. Prior to describing the details of this cooperative mechanism, a description of an energy efficiency control policy in the context of a network device is first provided.

FIG. 1 illustrates an example of a network device to which an energy efficiency control policy can be applied. As illustrated in FIG. 1, network device 110 includes physical layer device (PHY) 112, media access control (MAC) 114, and host 116. In general, host 116 can comprise suitable logic, circuitry, and/or code that may enable operability and/or functionality of the five highest functional layers for data packets that are to be transmitted over the link. Since each layer in the OSI model provides a service to the immediately higher interfacing layer, MAC controller 114 can provide the necessary services to host 116 to ensure that packets are suitably formatted and communicated to PHY 112. MAC controller 114 can comprise suitable logic, circuitry, and/or code that may enable handling of data link layer (Layer 2) operability and/or functionality. MAC controller 114 can be configured to implement Ethernet protocols, such as those based on the IEEE 802.3 standard, for example. PHY 112 can be configured to handle physical layer requirements, which include, but are not limited to, packetization, data transfer and serialization/deserialization (SERDES).

As FIG. 1 illustrates, network device 110 also includes energy efficiency control policy entity 118. As noted, energy efficiency control policy entity 118 can be designed to determine when to enter an energy saving state, what energy saving state (i.e., level of energy savings) to enter, how long to remain in that energy saving state, what energy saving state to transition to out of the previous energy saving state, etc.

Figure 2:
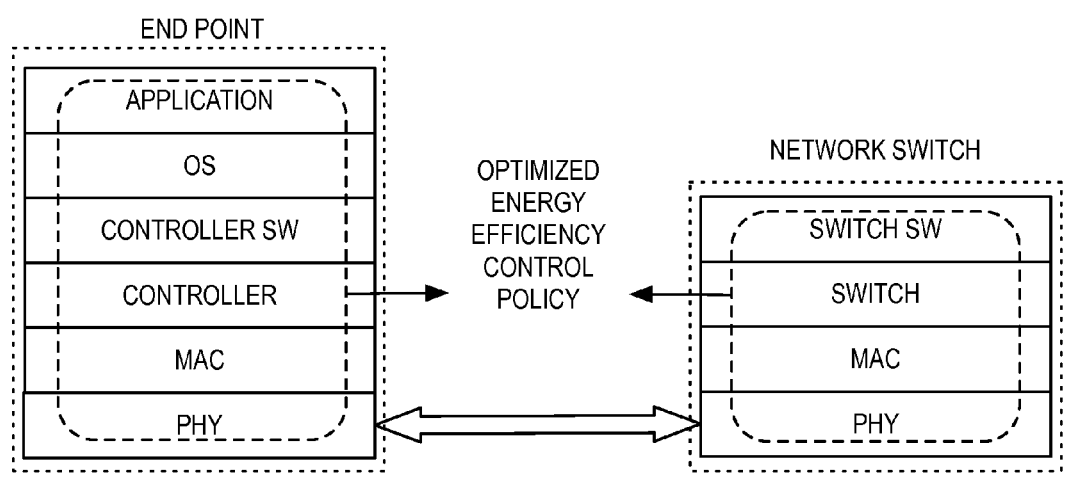
FIG. 2 illustrates an example of an energy efficiency control policy in a protocol stack.

Energy efficiency control policy entity 118 in network device 110 can include software code that can interoperate with various layers, including portions of the PHY, MAC, switch, or other subsystems in the host. Energy efficiency control policy entity 118 can be enabled to analyze traffic on the physical link and to analyze operations and/or processing of data in itself or in its link partner. In this manner, energy efficiency control policy entity 118 can exchange information from, or pertaining to, one or more layers of the OSI hierarchy in order to establish and/or implement the energy efficiency control policy. FIG. 2 illustrates an example energy efficiency control policy, which can touch various layers on both ends (e.g., controller and network switch) of the link to produce an optimized control policy.

In producing energy savings, an energy efficiency control policy can effect intelligent decision making based on energy efficiency control policy settings, parameters and configurations that are established by a user (e.g., system administrator). For example, the user can establish empty or non-empty conditions of ports, queues, buffers, etc. to determine whether to transition to or from an energy saving state. The user can also establish various timers that can govern the determination of when to transition between various defined energy saving states.

It is a feature of the present invention that the energy efficiency control policy is also responsive to time-sensitive protocol traffic. To illustrate the features of the present invention, the messaging protocol used for timing and synchronization in AVB is used as an example. As would be appreciated, however, the principles of the present invention are not limited by such an example.

In general, AVB devices periodically exchange timing information that allows both ends of the link to synchronize their time base reference clock very precisely. In IEEE 802.1AS, a single AVB device provides a master timing signal, to which the other AVB devices would synchronize their clocks. Synchronization of the clocks to the master timing signal is enabled by synchronization message packets that are typically sent every 125 ms.

Figure 3:
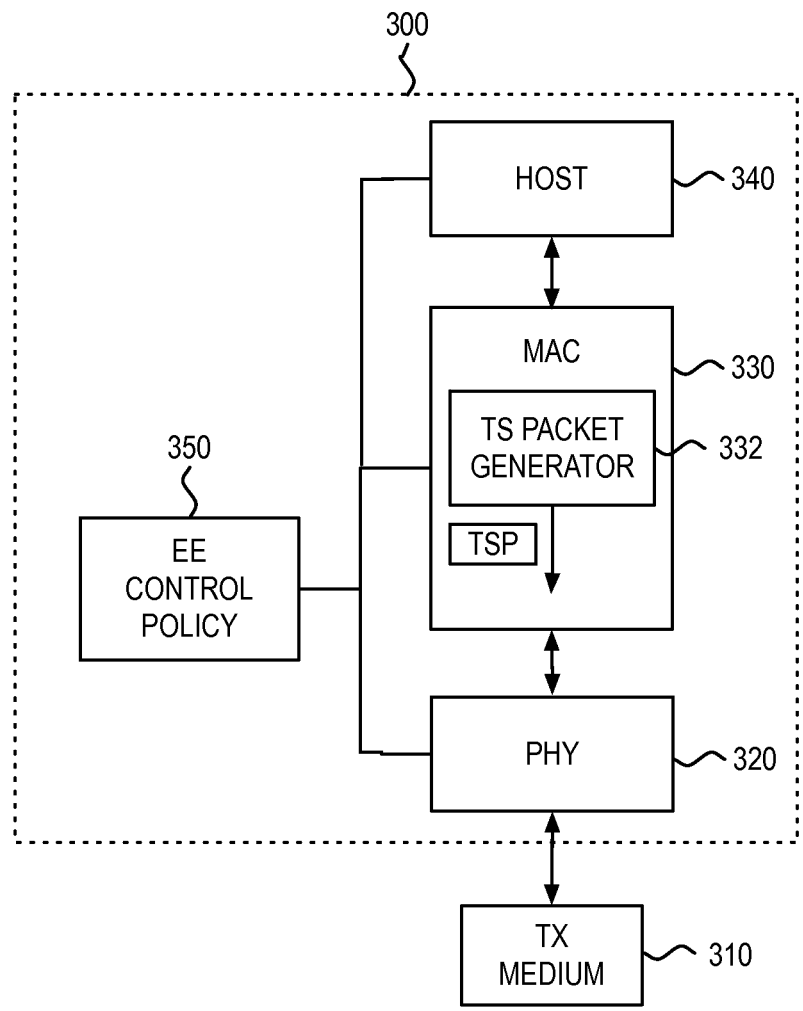
FIG. 3 illustrates an example embodiment of a network device that includes the generated of time-stamped packets in a network device

FIG. 3 illustrates an example embodiment of a network device that includes the generation of time-stamped packets in a network device. As illustrated, network device 300 includes energy efficiency control policy 350, which is coupled to host 340, MAC 330 and PHY 320, which in turn is coupled to transmission medium 310 (e.g., twisted pair cabling, fiber optic cabling, etc.). It should be noted that MAC 330 can be physically embodied as a MAC subsystem (e.g., in a switch or controller), an external stub device, or in a PHY (e.g., MACSec PHY or AutoGrEEEn PHY).

In this particular example, the transmission subsystem can be represented by PHY 320. PHY 320 would be designed to receive time-stamped synchronization message packets that are generated by TS packet generator 332. As illustrated, TS packet generator 332 is located in the MAC sublayer 330.

As would be appreciated, the designation of the transmission subsystem as a PHY device is not intended to limit the scope of the present invention. More generally, the transmission subsystem can represent any portion of the network device that is responsible for taking a generated time-stamped packet and delivering it substantially to the transmission medium. The designation of the particular boundary of the transmission subsystem would be dependent on the particular protocol mechanism used to generate the time-stamped packets. For simplicity, the example of FIG. 3 has roughly equated the transmission subsystem with the conventional boundaries of PHY device 320.

Conventionally, energy efficiency control policy 350 is designed to leverage energy saving states in network device 300 independently of time-stamped packets generated by TS packet generator 332. As such, time-stamped packets generated by TS packet generator 332 are expected to traverse PHY device 320 with a fixed latency measure. Compensation for fixed PHY delays can be performed in various ways. An example of such a compensation mechanism is described in non-provisional patent application Ser. No. 12/480,648, entitled "Method and System for Compensated Time Stamping for Time-Sensitive Network Communications," filed Jun. 8, 2009, which is incorporated by reference herein in its entirety.

As noted, the operation of energy efficiency control policy 350 in leveraging energy saving states in PHY 320 can interfere with the operation of the time-sensitive protocol. Specifically, the entry of PHY 320 into an energy saving state would cause the time-stamped packet generated by TS packet generator 332 to be buffered in a TX FIFO in MAC 330 or a buffer in PHY 320. This buffering would enable PHY 320 to be transitioned from an energy saving state to an active state to facilitate the transmission of the time-stamped packet.

Conventionally, from the perspective of energy efficiency control policy 350, the time-stamped packet generated by TS packet generator 332 is like any other traffic packet that would cause energy efficiency control policy 350 to "wake up" from an energy saving state. The time that it takes to "wake up" from the energy saving state would represent an additional latency that would be experienced by the time-stamped packet. This additional latency attributable to the wake time of PHY 320 would be unpredictable as it would be dependent on the determinations of energy efficiency control policy 350. Moreover, the additional latency attributable to the wake time of PHY 320 would be variable as the wake time can be dependent on the particular energy saving state and/or the processes implemented by energy efficiency control policy 350. In summary, the operation of energy efficiency control policy 350 would interfere with the operation of the time-sensitive protocol.

In this context, it is a feature of the present invention that energy efficiency control policy 350 can be designed to implement an intervention mechanism that can adjust the delivery of the time-stamped packet and/or the operation of the energy efficiency control policy.

Figure 4:
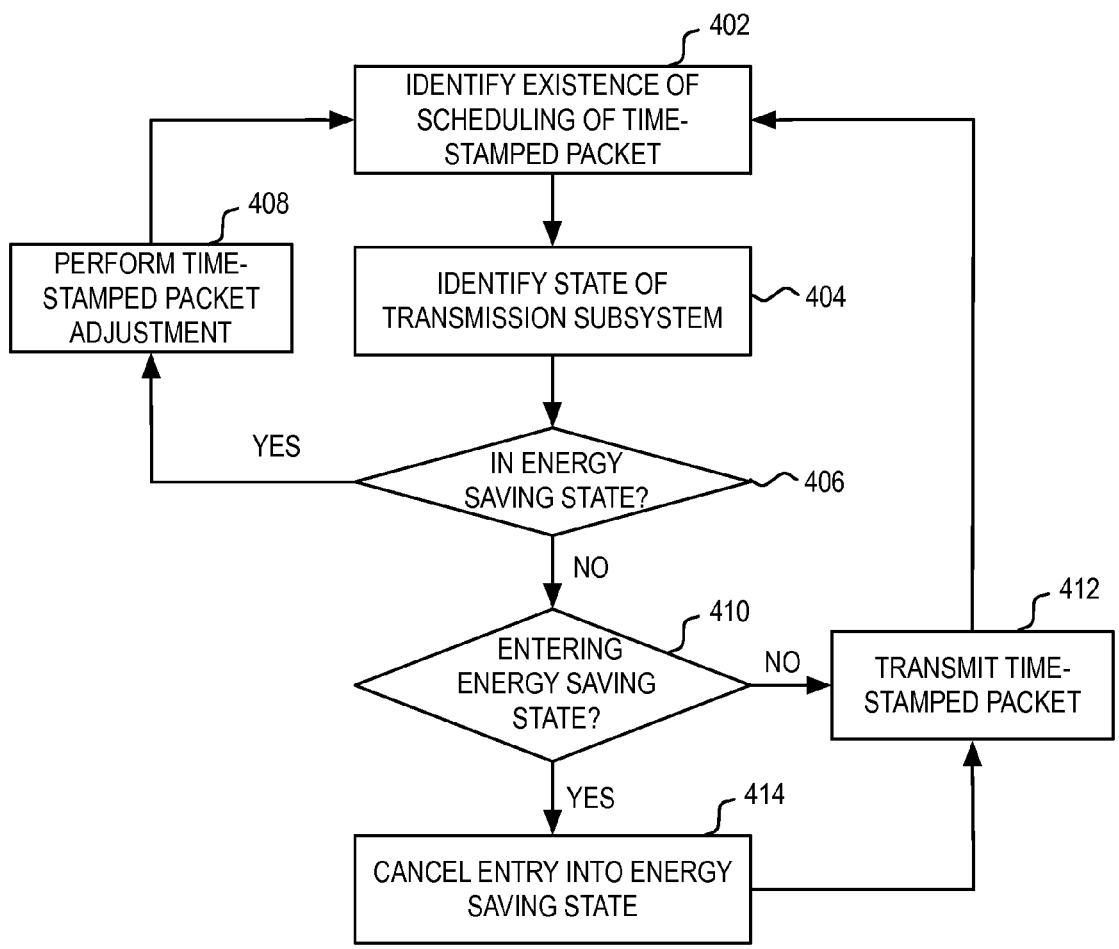
FIG. 4 illustrates a flowchart of a process of the present invention.

Adjustment of the delivery of the time-stamped packet and/or the operation of the energy efficiency control policy can be effected in a variety of ways. FIG. 4 illustrates a flowchart of an example process according to the present invention.

As illustrated, the process begins at step 402 where an energy efficiency control policy identifies the existence of the scheduling of a time-stamped packet for transmission. As time-stamped packets are inherently sensitive to buffering and latency, the identification of such packets enables the energy efficiency control policy to determine whether energy savings initiatives would produce an adverse impact.

After the existence of the scheduling of a time-stamped packet is identified, the energy efficiency control policy then identifies, at step 404, the state of the transmission subsystem. Next, at step 406, it is determined whether the transmission subsystem is in a energy saving state that would adversely impact the expected latency of the time-stamped packet in traversing the transmission subsystem for delivery onto the transmission medium.

Here, it should be noted that not every energy saving state would necessarily produce an adverse impact on latency. As various energy saving states can be defined with different levels of sub-rating, some energy saving states could be designed to handle low bandwidth traffic without an adverse impact on latency.

If it is determined at step 406 that the transmission subsystem is in an energy saving state that would adversely impact the expected latency, then the process would continue to step 408 where the energy efficiency control policy would perform an adjustment on the time-stamped packet.

In one embodiment, the adjustment by the energy efficiency control policy would be represented by the dropping of the time-stamped packet from the transmission path. While this form of adjustment would seem to be counterproductive to the time-sensitive protocol, it is actually designed to reduce the adverse impact of latency on the time-stamped packet. If the time-stamped packet was permitted to pass through the transmission subsystem while incurring additional, variable latency, the remote link partner would then receive a packet having an inaccurate time stamp. This inaccurate time stamp would then lead to the production of further inaccurate results by the remote link partner. For example, the additional latency due to the wake-up time of the transmit link partner would be perceived by the receive link partner as additional latency that can lead to a determination of a longer connection time (e.g., longer wire in a wired connection and a longer distance in a wireless connection). If the time-stamped packet is dropped due to the expected incurrence of additional, variable latency, then the worst case scenario would be the retransmission of a time-stamped packet at a later point in time. While the retransmission could delay a result determined using a time-stamped packet, the delayed result would not suffer from inaccuracy.

In another embodiment, the adjustment by the energy efficiency control policy would be represented by the adjustment of the time stamp contained within the time-stamped packet. In this embodiment, the adjustment can be based on known "wake up" times in transitioning from an energy saving state to an active state. These "wake up" times that are known by the energy efficiency control policy can be used in addition to the known, fixed delays of the transmission subsystem to ensure that the time stamp carried in the time-stamped packet is accurate.

As described, various adjustments can be made to a time-stamped packet based on conditions known by the energy efficiency control policy. The adjustment of the time-stamped packet thereby ensures that the time-sensitive protocol is not adversely impacted by the energy savings initiatives governed by the energy efficiency control policy.

Coordination between the energy efficiency control policy and the time-sensitive protocol can also occur even when it is determined at step 406 that the transmission subsystem is not in an energy saving state that would adversely impact the expected latency. If such is the case, the process would continue to step 410 where a further determination is made as to whether the transmission subsystem is preparing to enter into an energy saving state that would adversely impact the expected latency.

If it is determined at step 410 that the transmission subsystem is not preparing to enter into an energy saving state that would adversely impact the expected latency, then the process would continue to step 412 where the time-stamped packet would be transmitted by the transmission subsystem. This scenario would represent the case where the time-stamped packet would incur only the known, fixed latency through the transmission subsystem.

If, on the other hand, it is determined at step 410 that the transmission subsystem is preparing to enter into an energy saving state that would adversely impact the expected latency, then the process would continue to step 414 where the energy efficiency control policy would cancel the pending transition by the transmission subsystem into an energy saving state. Once the transition is canceled, the time-stamped packet would be transmitted by the transmission subsystem at step 412 with the known, fixed latency.

As has been described, the energy efficiency control policy can be designed to cooperate with a time-sensitive messaging protocols to prevent the adverse impact created by additional, variable latency through the transmission subsystem. As would be appreciated, the example provided above is not intended to be limiting. The principles of the present invention can be applied to any time-sensitive protocol such as those time-sensitive messaging protocols that are designed to produce time-stamped message traffic. Here, it should be noted that the principles of the present invention can be applied to protocols higher than Layer 2 such as the resource reservation protocol (RSVP). Moreover, the particular adjustment mechanism would be implementation dependent as the particular point in which a time-stamped packet is dropped changed can vary. In particular, the adjustment mechanisms can be implemented in a conventional PHY, PHY with an energy efficiency control policy, a MACSEC PHY, MAC, controller, etc.

It should also be noted that the principles of the present invention can be applied to synchronization (protocol) packets, data, and/or both. With respect to data, the data itself could be adjusted or dropped as needed for a particular application. For example, data (e.g., video frame) can be dropped if the data is significantly out of sync such that its transmission would produce an objectionable impact.

It should be noted that the principles of the present invention outlined above can be applied to various contexts. For example, the principles of the present invention can be used with different standard or non-standard network speeds (e.g., 1 G, 2.5 G, 10 G, 40 G, 100 G, 400 G, 1 T, etc.), and various point-to-multipoint networks (e.g., APON, BPON, GPON, GEPON, EPOC, proprietary PONs such as 100 M PON, 2.5 GPON, etc.).

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
   determining whether a time-stamped packet is scheduled for transmission when a transmission subsystem in a network device is in an energy saving state, the transmission subsystem supporting transitions between an active state and the energy saving state; and
   dropping the time-stamped packet when it is determined that the time-stamped packet is scheduled for transmission when the transmission subsystem is in the energy saving state.

2. The method of claim 1, further comprising transmitting, by the transmission subsystem, the time-stamped packet when it is determined that the time-stamped packet is scheduled for transmission when the transmission subsystem is in the active state.

3. The method of claim 1, further comprising generating the time-stamped packet in accordance with IEEE 1588.

4. The method of claim 1, further comprising generating the time-stamped packed by a media access control layer subsystem.

5. The method of claim 1, wherein the transmission subsystem is a physical layer device.

6. The method of claim 1, wherein the determining comprises determining by an energy efficiency control policy in the network device.

7. The method of claim 1, further comprising
   determining whether the time-stamped packet is scheduled for transmission when the transmission subsystem is in the process of transitioning from the active state to the energy saving state; and
   canceling the process of transitioning of the transmission subsystem from the active state to the energy saving state when it is determined that the time-stamped packet is scheduled for transmission.

8. A network device, comprising:
   a transmission subsystem that supports transitions between an active state and an energy saving state; and
   an energy efficiency control policy module that determines whether a time-stamped packet is scheduled for transmission when the transmission subsystem is operating in the energy saving state, the energy efficiency control policy module modifying a time stamp contained in the time-stamped packet to account for an increase in latency due to the transmission subsystem operating in the energy saving state.

9. The network device of claim 8, wherein the time-stamped packet is a packet generated in accordance with IEEE 1588.

10. The network device of claim 8, further comprising a media access control layer subsystem that generates the time-stamped packet.

11. The network device of claim 8, wherein the transmission subsystem is a physical layer device.

12. A method, comprising:
generating a time-stamped packet for transmission by a transmission subsystem in a network device, the transmission subsystem supporting transitions between an active state and an energy saving state; and
determining, by an energy efficiency control policy module in the network device, whether a scheduling of a transmission of the time-stamped packet by the transmission subsystem is impacted by the usage of an energy saving state by the transmission subsystem.

13. The method of claim 12, further comprising transmitting, by the transmission subsystem, the time-stamped packet when it is determined that the time-stamped packet is scheduled for transmission when the transmission subsystem is in the active state.

14. The method of claim 12, wherein the generating comprises generating a packet in accordance with IEEE 1588.

15. The method of claim 12, wherein the generating comprises generating by a media access control layer subsystem.

16. The method of claim 12, wherein the transmission subsystem is a physical layer device.

17. The method of claim 12, further comprising dropping the time-stamped packet when it is determined that scheduling of the transmission of the time-stamped packet by the transmission subsystem is impacted by the usage of the energy saving state by the transmission subsystem.

18. The method of claim 12, further comprising correcting a time stamp in the time-stamped packet when it is determined that scheduling of the transmission of the time-stamped packet by the transmission subsystem is impacted by the usage of the energy saving state by the transmission subsystem.

* * * * *